Feb. 2, 1965  R. C. LAYNE  3,167,796
DOCKBOARD UNIT
Filed April 24, 1962  4 Sheets-Sheet 1
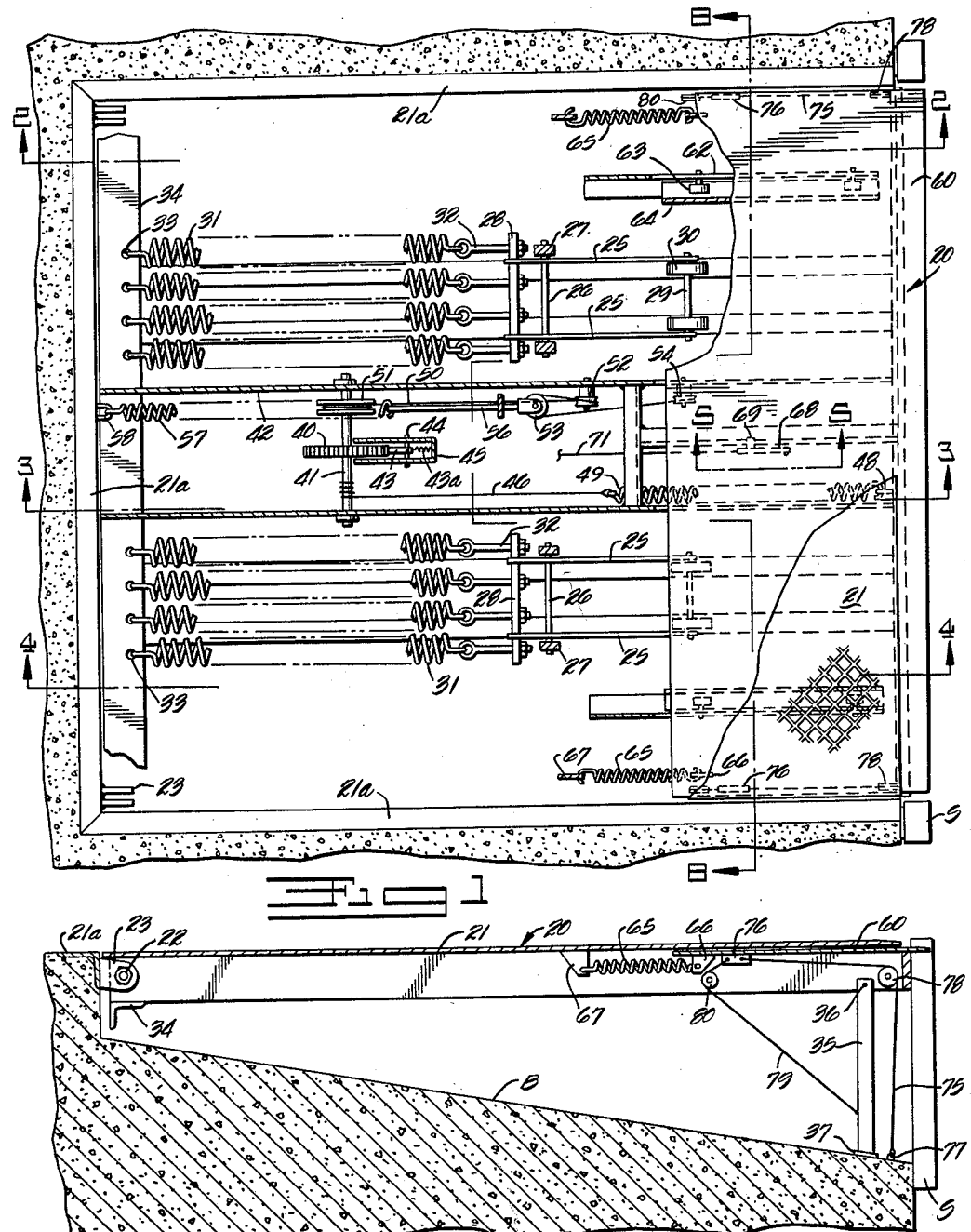
INVENTOR.
RICHARD C. LAYNE
BY
MAHONEY, MILLER & RAMBO
BY
ATTORNEYS.

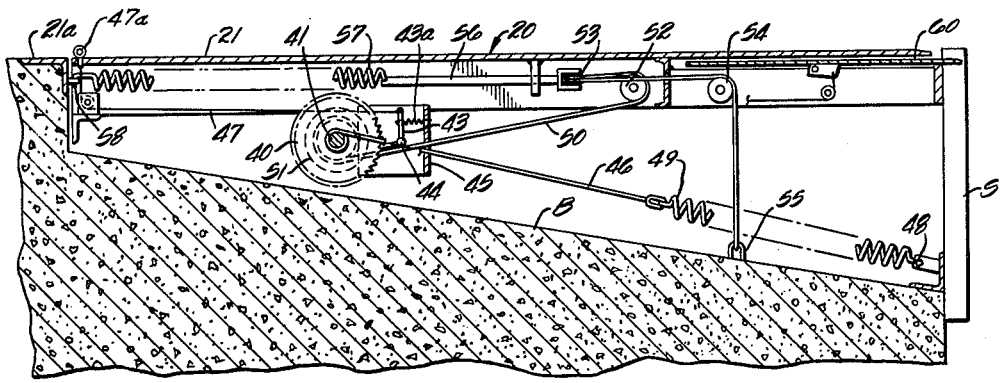
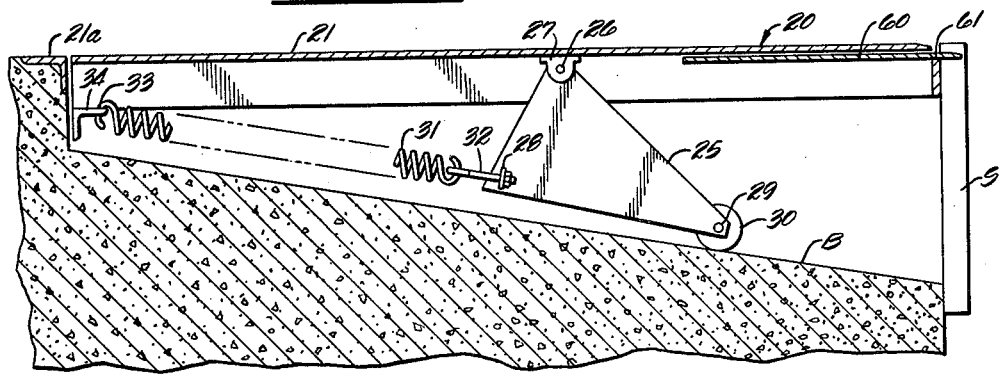
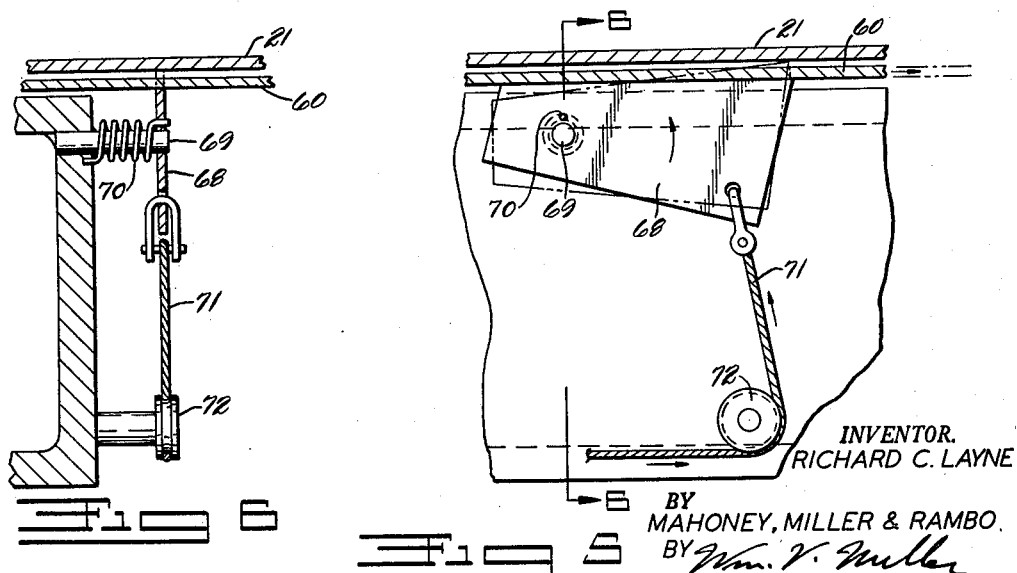

Feb. 2, 1965 R. C. LAYNE 3,167,796
DOCKBOARD UNIT
Filed April 24, 1962 4 Sheets-Sheet 3
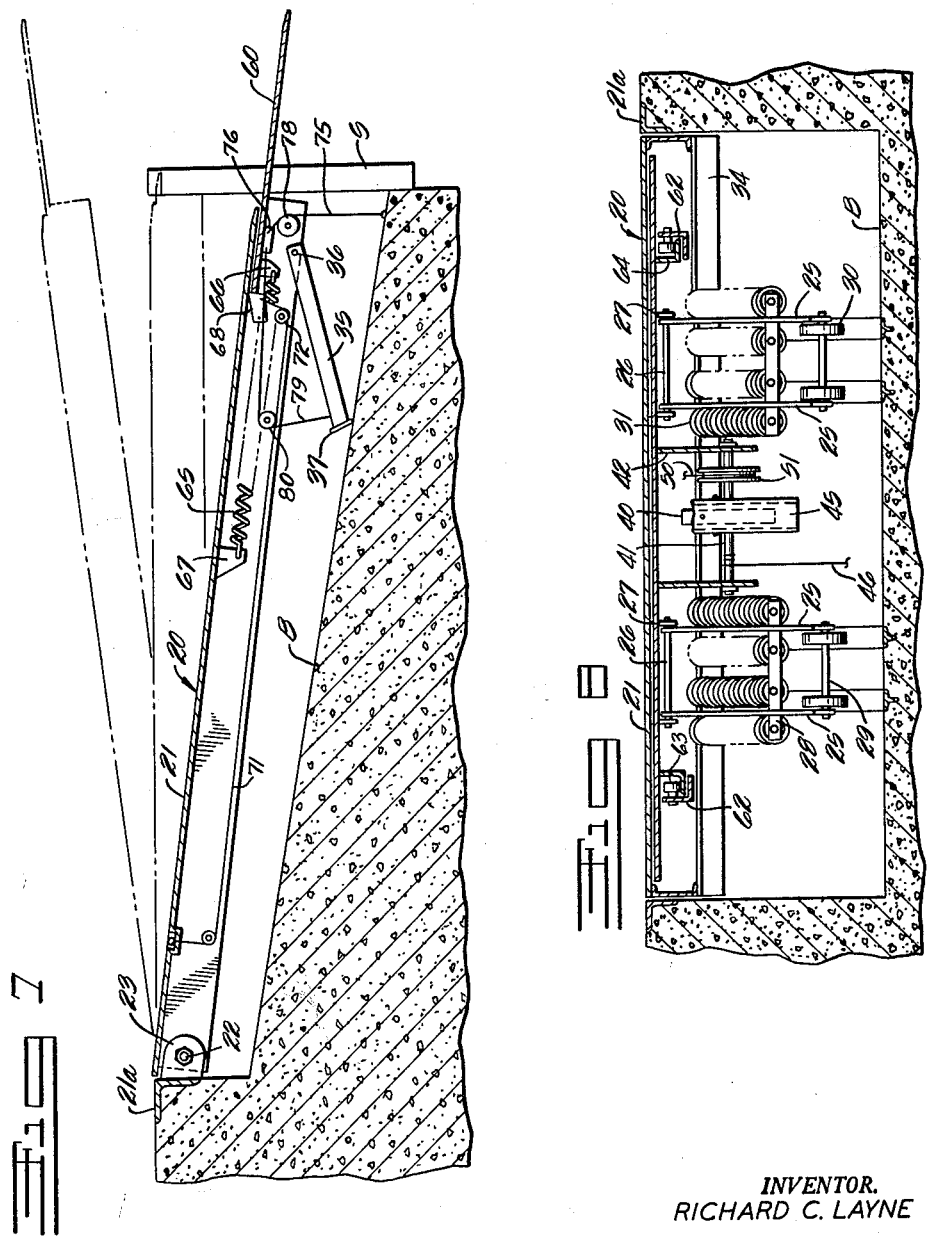
INVENTOR.
RICHARD C. LAYNE
BY
MAHONEY, MILLER & RAMBO
BY
ATTORNEYS.

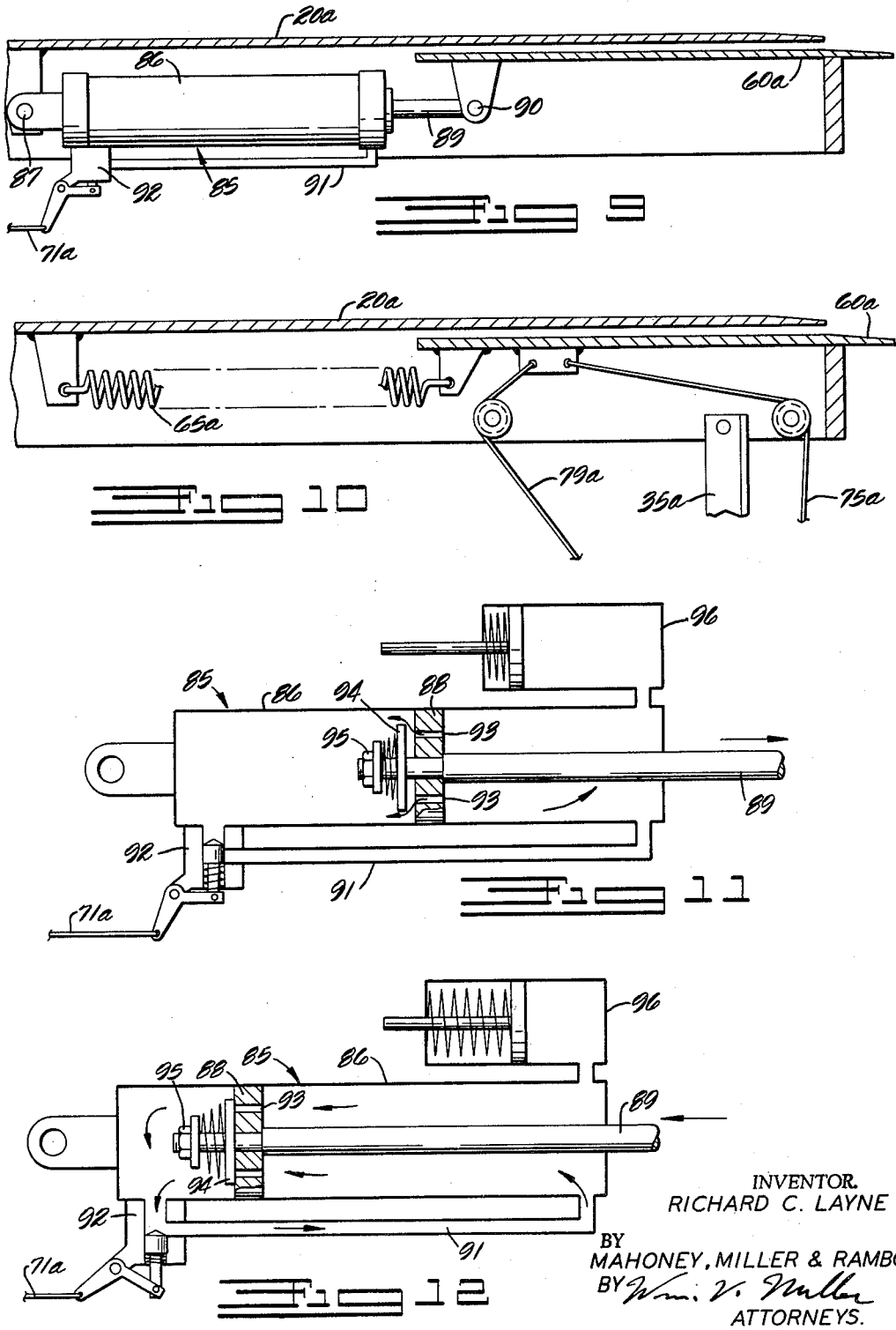

3,167,796
DOCKBOARD UNIT
Richard C. Layne, P.O. Box 601, Lansdale, Pa.
Filed Apr. 24, 1962, Ser. No. 189,764
5 Claims. (Cl. 14—71)

My invention relates to a Dockboard Unit. It relates, more specifically, to a unit which includes a dockboard that is mounted on a loading and unloading dock for vertical swinging movement and which has a slidable lip on its outer end that is automatically extended and locked in response to upward movement of the dockboard and which can be released when desired and will be automatically retracted.

Various types of dockboard units have been provided in association with truck loading and unloading docks. These units usually include a dockboard which is pivoted for movement between a cross-traffic position, where it is recessed in the dock surface, to a loading position where the outer end of the dockboard overlaps the rear end of a truck bed, which has been backed into association therewith, to facilitate loading and unloading.

I have devised a dockboard unit which includes a pivoted dockboard or ramp and which has a lip slidably mounted at its outer end for extension and retraction relative to the dockboard or ramp. With the dockboard in its lower or cross-traffic position, the lip is in a retracted inoperative position where it will not interfere with backing of the truck or carrier into association with the dock at the dockboard or ramp location. When the truck is backed into position, the doors of the truck can be opened without interference with the dockboard unit and the extreme rear end of the truck bed can be unloaded. Then the dockboard can be released for automatic upward swinging and the lip will automatically be extended and locked so that if the board is now forced downwardly, the lip will overlap the unloaded end of the truck body and will facilitate movement of unloading equipment into and out of the truck body. This dockboard unit is so designed that the dockboard thereof can move to a level lower than its original cross-traffic level if required because of the truck bed being lower. To bring the lip out of the carrier, without moving the carrier, the lip may be released and it will then be retracted automatically.

The slidable lip can be moved into and out of the truck bed without moving the truck. With the unit provided, there are no projecting actuating parts or portions of the slidable lip and, therefore, an overhead door may be moved downwardly into closed position relative thereto, and need not be opened until a truck backs into association therewith since the lip can later be positioned over the truck bed of the previously positioned truck after the door is opened. The operating mechanism for the dockboard is such that the dockboard can adjust itself to the level of the truck for unloading thereof and can adjust itself upwardly as the truck is unloaded and the bed moves upwardly due to lessening of weight on the springs thereof.

The preferred embodiment of my dockboard unit is illustrated in the accompanying drawings wherein similar characters of reference designate corresponding parts and wherein:

FIGURE 1 is a plan view, partly broken away, of a dockboard unit according to my invention.

FIGURE 2 is a longitudinal vertical sectional view taken along line 2—2 of FIGURE 1, showing the ramp in its lowered cross-traffic position and illustrating the slidable lip operating means.

FIGURE 3 is a longitudinal vertical sectional view taken along line 3—3 of FIGURE 1 showing the hold-down mechanism for the ramp and illustrating the ramp in its lowered cross-traffic position.

FIGURE 4 is a longitudinal vertical sectional view taken along line 4—4 of FIGURE 1 showing the ramp in lowered position and illustrating the ramp-raising means.

FIGURE 5 is an enlarged longitudinal vertical sectional view taken along line 5—5 of FIGURE 1 showing details of the lip-latching means.

FIGURE 6 is a sectional view taken along line 6—6 of FIGURE 5.

FIGURE 7 is a longitudinal sectional view showing different vertical positions of the ramp.

FIGURE 8 is a transverse sectional view taken along line 8—8 of FIGURE 1 showing the lip-guiding and supporting means and the ramp-raising and hold-down means.

FIGURE 9 is a longitudinal vertical sectional view showing a fluid-actuated lip control unit.

FIGURE 10 is a longitudinal vertical sectional view showing the return spring and associated parts for the fluid-actuated lip control unit.

FIGURE 11 is a diagrammatic view showing the fluid-actuated lip control unit in condition for permitting extension of the lip.

FIGURE 12 is a similar view but with the lip control unit in condition to permit retraction of the lip.

With reference to the drawings, FIGURES 1 to 4 illustrate the general structure of this dockboard unit. The unit is so designed that a minimum of framework is required to mount the unit within the pit in the dock designed to receive the unit. In fact, the ramp-raising mechanism is designed to cooperate with the outwardly and downwardly inclined bottom B of the pit which is open at its top and outer sides. The board or ramp 20 is mounted for vertical swinging movement in association with the pit. The ramp is suitably fabricated from supporting beams and cross members which carry on their upper edges a surface plate 21 which, in the lowered cross-traffic position of the ramp, is flush with adjacent surfaces of the dock. A marginal or curb angle 21a is provided around the inner and side edges of the pit opening. The ramp 20 is mounted on this curb angle by means of connecting pivot pins 22 (FIGURE 2) which cooperate with the pivot lugs 23 carried at the inner corners of the curb angle. Thus, the ramp 20 is pivoted at its inner end for vertical swinging movement and in cross-traffic position is flush with the upper surface of the curb angle 21a although it may swing above or below the sides of the curb angle.

In order to cause vertical swinging movement of the ramp or board 20, suitable mechanism is provided and is supported by the ramp itself. This mechanism includes bell crank levers in the form of upright triangular rocker plates 25 which are pivoted at their upper corners for vertical swinging movement by a pivot shaft 26 to depending brackets 27 that are suitably attached to the underside of the plate 21 at transversely spaced positions located intermediate the inner and outer ends of the ramp 20. The plates 25 are arranged in pairs, a pair being provided at each side of the center line of the ramp (FIGURES 1 and 8). The levers or plates 25 of each pair are rigidly connected together by a transversely extending connecting bar 28.

Each pair of plates 25 carries at its forward and lower corner a transversely extending roller shaft 29 which supports a pair of laterally spaced rollers 30 (FIGURES 1 and 4). These rollers are in engagement with and operate upon the bottom surface B of the pit which serves as an inclined cam surface for cooperating with the rollers, and embedded roller-contacting metal strips may be provided in this surface.

A set of tension springs 31 tends to swing an associated set of plates 25 about the axis of the pivot shaft 26 and keep the rollers 30 in engagement with the cam surface B. Each spring is connected at its outer end to the bar 28, that connects the plates 25, by means of the adjustable eye bolts 32. The inner end of each spring is anchored at 33 to a transversely extending angle member 34 rigidly secured to the ramp 20 at its inner pivoted end. Thus, the springs 31 tend to pivot the plates 25 and cause the rollers 30 to produce with the surface B a camming action tending to raise the ramp 20, but this raising is normally prevented by hold-down mechanism which will be described later. In a cross-traffic position, as shown in FIGURE 2, the ramp is supported by pendulum legs 35 which are pivoted at 36 adjacent their upper ends to the outer end of the ramp 20. They are provided with angled feet 37 for engaging the inclined pit bottom surface B as shown in this figure.

For holding the board down in the cross-traffic position shown in FIGURES 2, 3, 4 and 8, the latch arrangement shown in FIGURE 3 may be provided. As indicated in FIGURE 1, this arrangement is carried by the ramp between the sets of ramp-raising springs 31. It comprises a ratchet wheel 40 keyed to a transverse shaft 41 that is rotatably carried by laterally spaced longitudinally extending support plates 42 (FIGURE 8) depending from the plate 21. A pawl in the form of a bell crank lever 43 is provided for preventing rotation of the ratchet wheel counterclockwise (FIGURE 3) when engaged therewith but for permitting clockwise rotation. This pawl 43 is pivoted at 44 to a bracket 45 which depends from the underside of the ramp plate 21. A spring 43a normally keeps the pawl engaged with the ratchet. To release the pawl when desired, a cord 47 is connected to the upper end thereof and runs to a suitable location above the ramp where a release ring 47a is provided.

A cable 46 is provided for turning the ratchet wheel 40 clockwise and for this purpose, its outer end is connected to the tension spring 49 which is anchored at 48 (FIGURES 1 and 3) at the outer side of the pit on the bottom surface B thereof. The other end of this cable is wound around the shaft 41 in such a manner as to tend to rotate it clockwise.

Another cable 50 has one end wound around and anchored to a pulley sheave or drum 51 in such manner that a pull on the cable tends to rotate the pulley counterclockwise. This pulley is keyed on the shaft 41 and will, therefore, tend to rotate the ratchet wheel 40 counterclockwise and this rotation will normally be prevented by the latching pawl 43. The cable 50 passes outwardly over an idler 52 on the board and then inwardly around an idler 53 and then again outwardly and downwardly over an idler 54 carried by the board to an anchoring U-bracket 55 fixed at the surface B. The idler 53 is movably carried by a guide rod 56 mounted for longitudinal slidable movement on the board 20. The opposite end of this rod is connected to the outer end of a tension spring 57 which is anchored at its inner end to the board 20 as indicated at 58.

It will be apparent that with this hold-down mechanism, when the ring 47a is pulled the latch pawl 43 is released from the ratchet wheel 40 permitting it to rotate in a counterclockwise direction and the springs 31 will swing the plates 25 downwardly to cause the rollers 30 to act on the cam surface B and raise the ramp 20, thereby unwinding the cable 50 from the pulley or drum 51. At the same time, the cable 46 will wind on the shaft 41 thereby stretching the spring 49. The spring 57 acting on the idler 53 will always keep the cable 50 taut. Whenever the ring 47a is released, the latching pawl 43 will again be engaged by the teeth of the ratchet wheel 40 and prevent further rotation, the necessary counterclockwise rotation for engagement being produced by the spring 49. This will be true even though, as will later appear, the board moves below a cross-traffic position. The board can move downwardly to seek its own level ever after the ratchet pawl is engaged since as it lowers, the cable 46 and spring 49 will rotate the wheel 40 clockwise.

The board or ramp 20 at its outer end is provided with a slidable lip 60 and means is provided for automatically extending the lip as the ramp 20 is raised. Means is also provided for simultaneously swinging the pendulum legs 35 out of their cross-traffic supporting position.

The lip 60 extends the full width of the ramp or board and is mounted directly below the plate 21 thereof. Suitable means is provided for supporting and guiding the lip for sliding movement relative to the plate 21 and through a slot 61 at the outer end of the board. This means is shown in FIGURES 1 and 8 as comprising supporting and guiding angles 62 which extend longitudinally of and are secured to the board plate 21 inwardly of the retracted position of the lip, the lip being free to move between the angles and the adjacent surface of the board plate at the forward portions of the angles. These angles carry rollers 63 which engage the upper surfaces of flanges of angles 64 which are attached to the undersurface of the lip 60. Thus, the lip is guided in and out relative to the board and when the lip rests on a truck or other carrier, the thrust will be taken by the rollers 63.

The lip 60 is normally retracted by means of tension springs 65 (FIGURES 1 and 2) disposed at the opposite ends thereof. Each spring is attached to the lip adjacent the inner edge of the lip by a bracket 66 and is anchored at its inner end by a bracket 67 to the ramp or board 20. For locking the lip in its extended position, a latching lug 68 is provided at the center line of the ramp. This lug 68 is pivoted on a pin 69, carried by the ramp, as shown in FIGURES 5 and 6, for vertical swinging movement. A torsion spring 70 on the pivot pin 69 biases the lug 68 upwardly. The upper edge of the lug will engage the undersurface of the lip until the lip is fully extended at which time the outer straight edge of the lug will move into engagement with the inner edge of the lip to hold it in extended position as shown in FIGURE 5. To release the latching lug, a flexible member or cable 71 is attached to its outer lower corner and passes inwardly around an idler 72 to a suitable actuating point.

A connection to the lip is provided for automatically extending it by overcoming the force of the retracting springs 65. This connection comprises a cable 75, shown in FIGURES 1 and 2, which is connected at its inner end by a bracket 76 depending from the lip and one of which is disposed adjacent each end of the lip. The outer end of this cable is fixed at 77 to the surface B adjacent the outer side of the pit. This cable passes around an idler pulley 78 at the outer corner of the ramp or board 20 and, consequently, when the board or ramp raises, the cable pulls the lip outwardly. At the same time, it is desirable for the legs 35 to be swung out of ramp-supporting position and this is accomplished by a cable connection at each side of the board or ramp. Thus, a cable 79 is connected to the lower end of each leg and passes inwardly and upwardly over a pulley 80, carried by the ramp, and then outwardly where it is connected to the bracket 76 on the lip 60. Thus, as the lip is extended, the legs 36 are swung upwardly as shown in FIGURE 7. This permits adjustment of the ramp down to a position below the cross-traffic horizontal position.

It will be apparent that when the pull ring 47a is pulled to release the latch 43 and the board 20 starts to swing upwardly, the lip 60 will be projected by a pull on the cable 75 since the rocker plates 25 will swing the board upwardly to exert this pull. This will project the lip 60 from the retracted position shown in FIGURE 2 to the extended position shown in FIGURE 7 at which time the latch 68 will engage the lip 60 and hold it in this extended position. Then, if the board 20 is again lowered by merely stepping on it or running a fork truck onto it, the entire board will swing down as shown in FIGURE 7 where the lip will rest on the truck bed if it has been backed into association with the bumpers S which are at each side of the pit. It will be understood that the springs 31 are just of sufficient strength to overcome the weight of the dockboard or ramp 20 and raise it when the latching lever 43 is released. Outward movement of the lip 60 will be limited by the cables 79 connected thereto. When any substantial weight is applied to the board, the springs 31 will be overcome and the board will swing downwardly. When weight is applied to the board 20 to move it downwardly, the ratchet wheel 40 will be rotated clockwise and the extended lip 60 will seek a proper level in contact with the bed of the truck. As the truck is unloaded and the bed rises, due to a lessening of weight on the truck springs, the spring 57 extends so that the board and lip will swing upwardly to automatically adjust the lip upwardly with the truck bed.

The bumpers S are provided on the face of the dock and project therefrom so that the lip can be in retracted position when the truck backs into association with the dockboard unit and the truck will not contact the lip but will contact the bumpers which project slightly outwardly of the lip. Therefore, when the board is released, even with the truck in position, the board 20 can swing upwardly and simultaneously the lip 60 can start moving outwardly toward its projected position.

The lip 60 will be automatically retracted whenever desired, if a pull is exerted on the cable 71 to release the latching lug 68 from the inner edge of the lip. The springs 65 will then take over to retract the lip 60 within the board or ramp plate 21 provided there is sufficient slack in the cables 75 which will be present usually if the lip is contacting the bed of the truck due to the relatively low position of the board or ramp. Also, retraction of the lip 60 will permit swinging of the legs downwardly into cross-traffic supporting position since slack will be created in the cables 79.

In FIGURES 9 to 12, a different arrangement is provided for holding the lip in any position to which it is extended and for retracting it to any desired extent and holding it in such retracted position. This mechanism includes a fluid-actuated unit preferably in the form of a hydraulic cylinder and piston unit.

The lip 60a is normally held in retracted position exactly as before by means of the springs 65a. The lip is automatically extended upon upward swinging of the board or ramp by the cables 75a, exactly as before. The supportnig legs 35a are actuated as before by the cables 79a.

However, a cylinder and piston unit 85 is connected between the lip 60a and the board 20a to control the extension and retraction of the lip. This unit includes a cylinder 86 pivotally connected at 87 to the ramp. In the cylinder is a piston 88 which is fixed to an outwardly projecting rod 89 that is pivotally connected to the lip at 90. Between the opposed ends of the cylinder is a by-pass 91 controlled by a control valve 92 which is actuated by a cord or cable 71a.

The piston 88 is provided with a check valve arrangement which includes by-pass ports 93 extending therethrough which are controlled by an associated spring-loaded check valve disc 94. The disc is mounted for axial movement on the rod 89 but outward movement off the rod is prevented by a stop nut 95. A reservoir 96 is connected to the outer end of the cylinder 86.

Automatic extension of the lip 60a by the cable 75a is permitted by the cylinder and piston unit 85 as shown in FIGURE 11 with the valve 92 closed. At this time, the outward pull on the rod 89 unseats the disc 94 from the piston 88 as the fluid pressure is increased in the outer end of the cylinder and the fluid displaces through the ports 93 from the outer end of the cylinder 86 to the inner end thereof as shown in FIGURE 11, the by-pass 91 being closed by the valve 92. The lip 60a remains in the extended position against the force of the springs 65a as the disc 94 will seat itself when outward movement of the rod 89 has stopped. The extended lip 60a will be retracted by the springs 65a any time the valve 92 is opened as shown in FIGURE 12. The fluid in the inner end of the cylinder 86 will then be displaced to the outer end thereof through the by-pass 91 as the rod 89 moves inwardly as the ports 93 will be closed by the disc 94.

Thus, the lip can be extended automatically and will be retracted any time the control valve 92 is opened.

It will be apparent that there is provided a dockboard which has many features of advantage that have been discussed. Other advantages will be apparent.

According to the provision of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In a dockboard unit for installation in a dock having an inclined pit, a ramp pivotally mounted to the dock for swinging vertically and having its inner end pivoted and its outer end free for vertical swinging, ramp raising means including rocker members, each of which is pivotally connected at one end to the ramp and at the other end slidably supported on the pit incline and helical compression springs, one of which is anchored to the dock and the other end pivotally connected to the rocker member, ramp hold-down means including a tension spring anchored to the dock at one end, a cable connected to the tension spring at the end remote from the dock, a shaft rotatably journalled in the ramp, said cable wrapped around and secured to the shaft, a ratchet wheel fixed on the shaft, a pawl in selective engagement with the ratchet wheel and pivotally connected to the ramp, a drum fixed on the shaft, a cable secured to and wrapped around the drum at one end and anchored to the dock at the other end, and a spring biased pulley slidably mounted on the ramp and engaged by the said cable, a lip slidably mounted at the outer end of the ramp and adapted to move in a plane parallel to the plane of the ramp between a retracted and extended position, lip extending means actuated upon upward movement of the dockboard for extending the lip relative thereto including cable means attached to the dock at one end and to the lip at the other end, lip latching means including a rotatable lug on the ramp adapted to engage the lip in extended position and lip retracting means connected at one end to the ramp and at the other end to the lip.

2. A unit of claim 1 wherein the lip extending means include a cable having one end connected to the lip and another end connected to the dock, and an idler pulley on the ramp receiving the cable and changing the direction of the cable.

3. A dockboard unit of claim 1 wherein the lip latching means include a slot in the lip, said rotatable lug adapted to engage the slot pivotally mounted on the ramp, and a helically wound torsion spring in engagement with the ramp and the lug for biasing the lug toward the slot in the lip.

4. A dockboard unit of claim 1 wherein the lip retracting means comprises a tension spring having one end connected to the ramp and the other end connected to the lip whereby the lip is biased rearwardly.

5. A dockboard unit of claim 1 in combination with hydraulic means for positioning the lip at a desired position, including a piston and cylinder, one of which is connected to the ramp and the other to the lip, by-pass means connected to opposite ends of the cylinder, and a valve in the by-pass for selectively permitting fluid to travel through the by-pass.

(References on following page)

References Cited in the file of this patent

UNITED STATES PATENTS

| | | |
|---|---|---|
| 2,527,653 | Pierce | Oct. 31, 1950 |
| 2,639,450 | Ramer | May 26, 1953 |
| 2,828,497 | Matthews | Apr. 1, 1958 |
| 2,875,457 | Read et al. | Mar. 3, 1959 |
| 2,881,457 | Rodgers | Apr. 14, 1959 |
| 2,974,336 | Kelley | Mar. 14, 1961 |
| 2,993,219 | Pennington | July 25, 1961 |
| 3,006,008 | Loomis et al. | Oct. 31, 1961 |
| 3,081,470 | Feeley | Mar. 19, 1963 |
| 3,117,332 | Kelly | Jan. 14, 1964 |